Feb. 26, 1935.  A. B. TEWES  1,992,788
COMPOSITE BAKED BREAD LOAF FORMING APPARATUS
Filed May 23, 1932   3 Sheets-Sheet 1
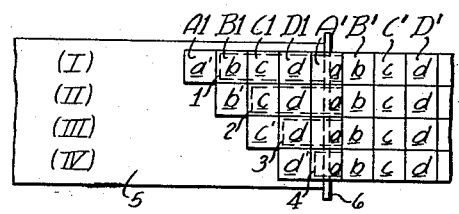
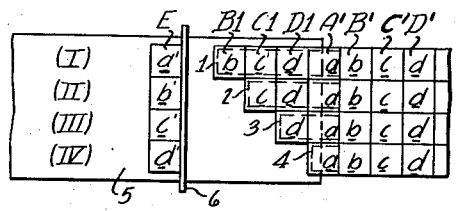
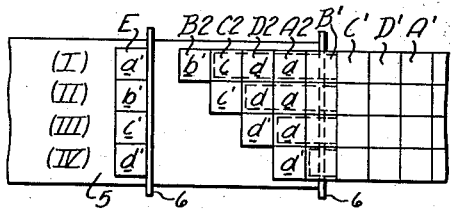
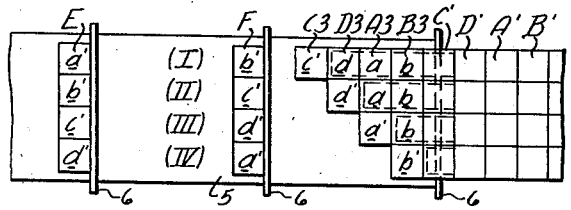
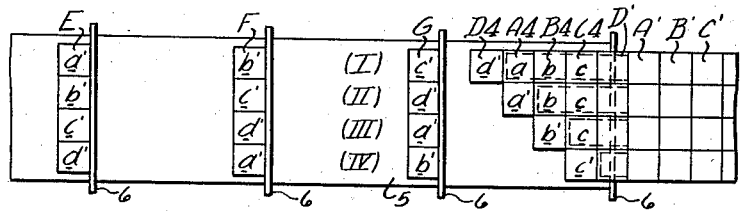
INVENTOR
Anthony B. Tewes.
By
ATTORNEY

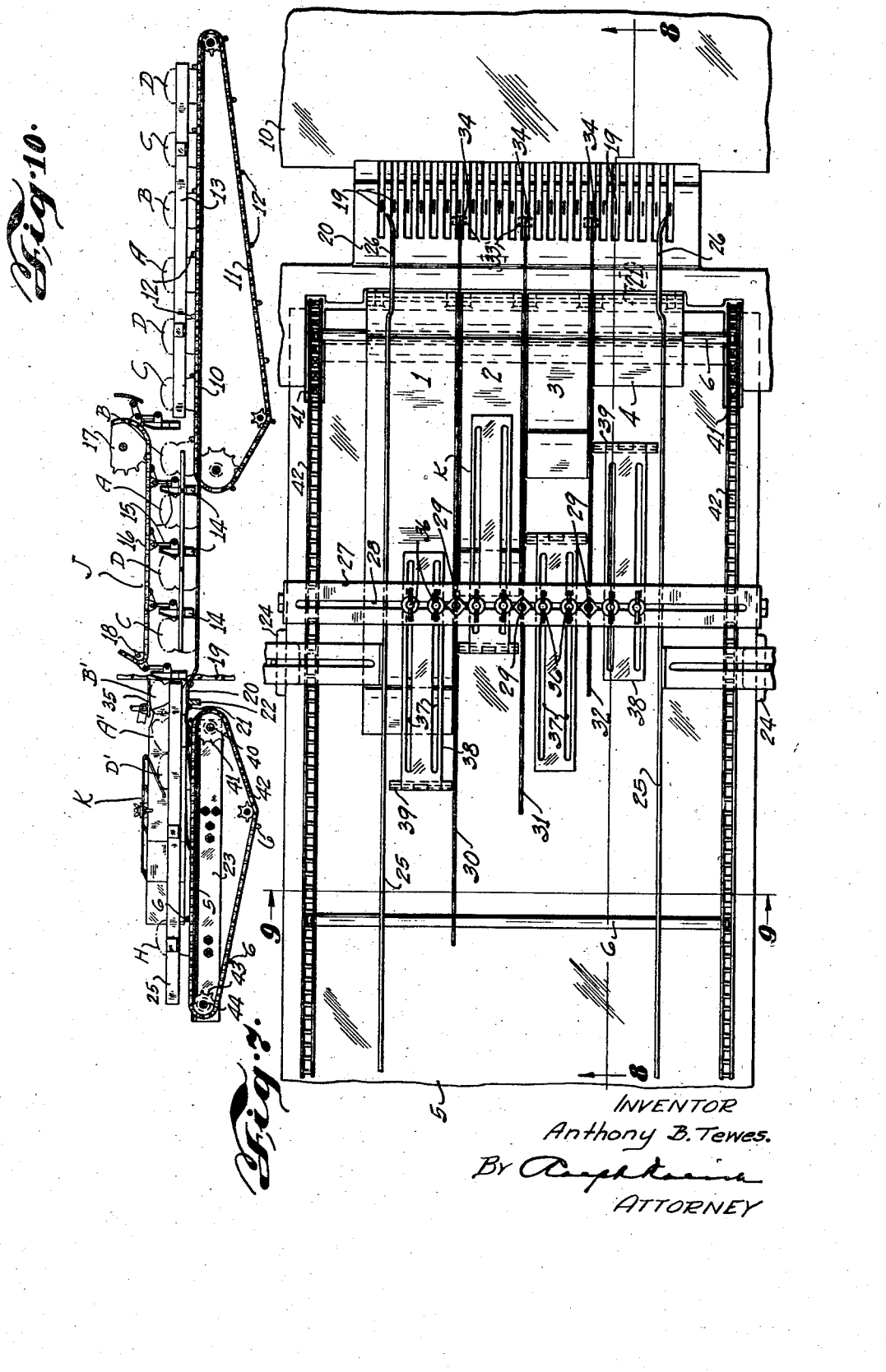

Feb. 26, 1935.  A. B. TEWES  1,992,788
COMPOSITE BAKED BREAD LOAF FORMING APPARATUS
Filed May 23, 1932  3 Sheets-Sheet 3
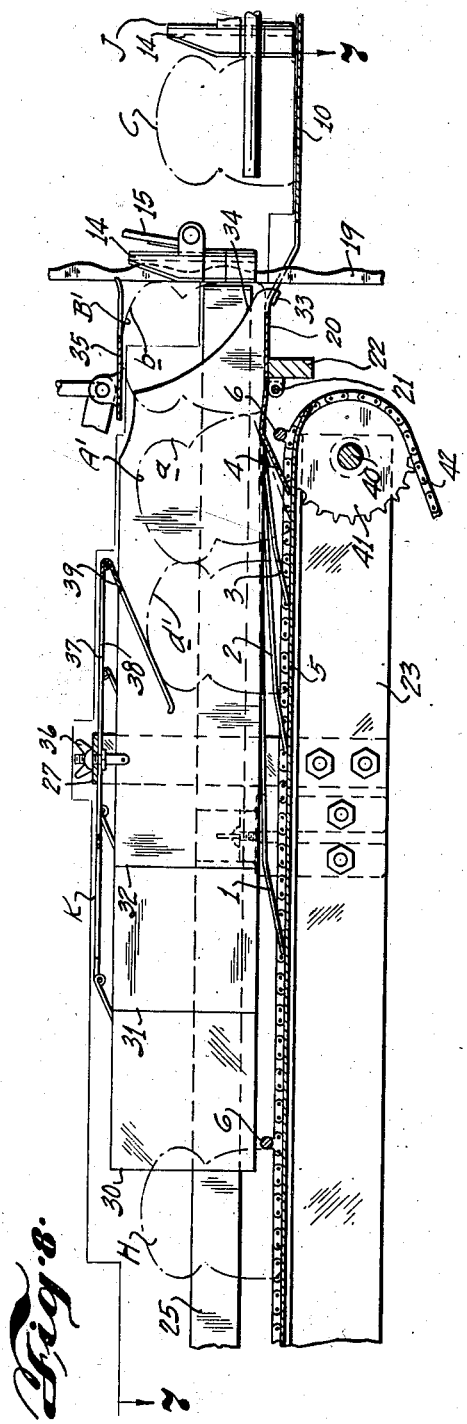
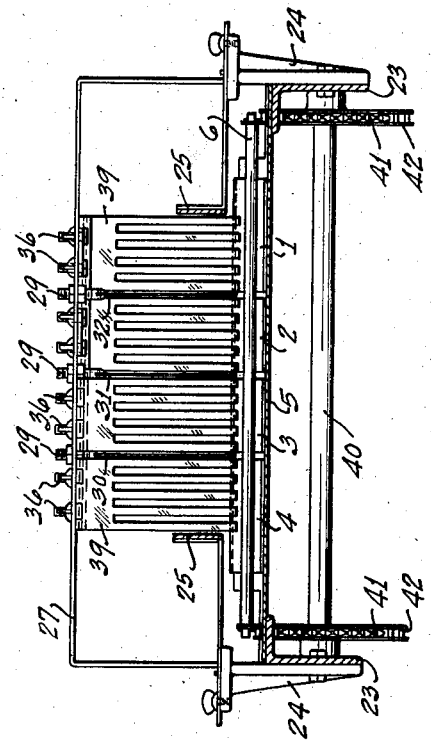
INVENTOR
Anthony B. Tewes.
By
ATTORNEY Patented Feb. 26, 1935

1,992,788

UNITED STATES PATENT OFFICE 1,992,788

COMPOSITE BAKED BREAD LOAF FORMING APPARATUS

Anthony B. Tewes, St. Louis, Mo., assignor to Papendick, Inc., St. Louis, Mo., a corporation of Missouri Application May 23, 1932, Serial No. 613,024

26 Claims. (Cl. 146—153)

This invention relates to a certain new and useful apparatus for the formation of composite loaf-articles, such as baked bread and the like.

My invention has for its chief object the provision of efficient apparatus for the facile, automatic, and economical formation of a composite bread-loaf composed of portions or fractions of a selected variety of preferably different kinds of sliced or unsliced bread, the apparatus being especially, though not exclusively, designed for employment in connection with standard breadloaf slicing machines, and the resulting composite loaf being readily and conveniently trayed and packaged and as a vendible commodity possessing the general form and dimensions of the usual bread-loaf so familiar to house-wives.

And with the above and other objects in view, my invention resides in the novel features of form, construction, arrangement, and combination of parts hereinafter described and pointed out in the claims.

In the accompanying drawings (three sheets),—

Figures 1 to 6, inclusive, respectively diagrammatically illustrate the formation of successive composite loaves of baked bread in accordance with my invention;

Figure 7 is a sectional top-plan view, taken approximately along the line 7—7, Figure 8, of an apparatus embodying my invention for effecting the formation of composite loaves of bread as diagrammatically shown in Figures 1 to 6, inclusive, the apparatus being shown in connection with a fragmentary portion of a bakedloaf slicing machine;

Figure 8 is fragmentary sectional view of the apparatus, taken along the line 8—8, Figure 7;

Figure 9 is a cross-sectional view taken approximately along the line 9—9, Figure 7, the loaf fractions retarder-wings being shown in downwardly flexed position; and Figure 10 is a reduced elevational view of the apparatus illustrated in association with a breadslicing machine, the latter being fragmentally shown partly in side elevation and partly in longitudinal section.

Referring now more in detail and by reference characters to the drawings, which illustrate a preferred embodiment of my invention, the composite loaf forming apparatus of my invention is here shown in operative relation with a breadslicing machine J of the type more particularly and in detail described and fully set forth in my co-pending application for Letters Patent for Baked-loaf slicing and traying machine, Serial No. 584,656, filed January 4, 1932, to which reference is made.

For present purposes, it may here be briefly said, the slicing machine J includes a feed-plate 10, over the one or loading-end of which works a conveyer 11 comprising suitably spaced loafpropelling bars or flights 12 for movement of the bread-loaves deposited on the feed-plate 10 toward the slicing mechanism of the machine between suitably transversely spaced loaf-guide members 13.

Toward the end of their travel on the plate 10, the propelled loaves are successively one by one engaged by respective loaf-feeders or pushers 14 supported by hangers 15 from, and motivated by and with, a suitable conveyer 16 in part trained over suitable sprockets 17, 18, for feeding the loaves successively to and through the series of slicing knives 19 of the machine, the sliced loaves being pushed or propelled in an abutting series through the knives 19 over a suitably slotted sliced-loaf-delivery or grid-plate 20, all as fully described in my said co-pending application, Serial No. 584,656.

Disposed suitably for reception of the sliced loaves successively emerging from the slicing knives 19, is what may be descriptively designated the loaf-sorting or separating and gathering apparatus K, which includes a series or plurality, in the present instance four in number, of so-called sorting or separating-frames 1, 2, 3, 4, each of which comprises an elongated flat strip-like plate or apron extending lengthwise of the apparatus and having a width equal to the loaf-transverse dimension or length of the particular loaf-fraction or fractions into which the loaf is to be sorted or separated, the outer frames 1, 4, however, being conveniently of slightly greater width than the inner frames 2, 3, as best seen in Figure 7.

For purposes presently appearing, the several frames or plates 1, 2, 3, and 4, vary in length, each of said frames being pivotally supported adjacent its rear end on a pintle-rod 21 suitably supported, in turn, from and by a cross-member 22 suitably fixed upon the frame of the slicing-machine J, whereby the frames 1, 2, 3, 4, are, respectively, swingably supported for vertical oscillation over an underlying sorting-table 5, with their pivoted ends flush with the slicing machine grid-plate 20, as best seen in Figures 7 and 8. Table 5 comprises, in the present instance, a suitably flat plate having side marginal angle-frame-members 23 supported in any manner suitable for the purpose, the longitudinal axis of the table 5 being disposed in alignment with the longitudinal axis of the slicing machine J.

The frame 1 is the longest one of the series and extends over the table 5, in the present instance, a distance of approximately four loaf-widths from the end of the grid-plate 20, the frame 1 terminating in a suitable downturned lip for normally endwise engaging the table 5 for bridging or supporting the frame 1 for substantially its entire length in spaced relation to and over the table 5.

The other frames or plates 2, 3, and 4, are similarly constructed. However, the frame 2 is reduced in length to project over the table 5 one loaf-width less than does the frame 1, the frame 3 projects lengthwise over the table 5 one loaf-width less than does the frame 2, and the frame 4 projects lengthwise over the table 5 one loaf-width less than does the frame 3, all as best seen in Figures 7 and 8.

Mounted on the table frame-members 23, are suitably spaced pairs of opposed brackets 24 adjustably supporting suitably transversely-spaced and opposed edgewise vertically presented loaf-guides 25 extending substantially the length, and suitably elevated above the plane, of the table 5. At their respective rear ends, the guides 25 project over the grid-plate 20 and integrally provide resilient wings 26 disposed approximately adjacent to the knives 19, as best seen in Figure 7. It may here be mentioned that the loaf passing through the series of knives 19 is slightly lengthwise expanded by the slicing operation, and the wings 26 function to tensionally engage the respective opposite crusted end-slices of the loaf for restoring the sliced loaf substantially to its pre-sliced shape and dimensions, the guides 25 being suitably adjusted for receiving the loaf lengthwise therebetween.

Also supported by the table frame-members 23, is an elevated transverse bridge-member or support 27 suitably spaced from the table 5 for passage of the sliced bread-loaves therebetween. The bridge-member 27 is provided with a longitudinal slot 28, in which works a series of fastening elements 29 for supporting a series, in the present instance three, of vertically depending partitions or intermediate guide-walls 30, 31, 32, respectively, extending longitudinally the table 5 in transversely spaced parallel relation with each other and with the guides 25, as best seen in Figure 9.

The walls or partitions 30, 31, 32, extend rearwardly to and upon the grid-plate 20 and are each provided with depending T-shaped lugs 33 for wall-retaining engagement in respective slots of the grid-plate 20 approximately adjacent the particular knife 19 working therein, the walls 30, 31, 32, at their respective rear ends having an acuminate edge, as at 34, in registration with the particular knife 19 for entering a kerf of the sliced loaf for splitting or subdividing the loaf into the desired number of fractions thereof, as four in the present instance, the walls 30, 31, 32, in association with the guides 25, being transversely spaced and adjusted for guiding the so-formed loaf-fractions suitably to and upon the respective frames 1, 2, 3, 4.

Thus the wall 30 extends between the frames 1, 2, and a suitable distance therebeyond over the table 5, the wall 31 extends between the frames 2, 3, and its length is correspondingly shorter than that of the wall 30, and the wall 32 extends between the frames 3, 4, and its length is likewise shorter than that of the wall 31, all as best seen in Figure 7.

The respective walls 30, 31, 32, in height preferably extend above the plane of the top of a loaf-fraction disposed therebetween, and for affording easy entrance of the wall-edge 34 into the kerf of the sliced loaf in registration therewith, the said edge 34 is suitably upwardly inclined away from the knife 19, as best seen in Figure 8.

And for preventing displacement of the loaf-slices emerging from the series of knives 19, a suitable so-called hold-down plate 35 is resiliently and shiftably supported over the grid-plate 20, as more particularly described in my said co-pending application Serial No. 584,656, the respective walls 30, 31, 32, being likewise suitably cut away for affording clearance to such hold-down 35, also as best seen in Figure 8.

Also engaging the slot 28 of the bridge-member 27, is a plurality of pairs of fastening elements 36 having respective engagement with corresponding pairs of longitudinal slots 37 provided in a corresponding series, in the present instance four, of brackets 38 each carrying a hingedly connected freely swingable depending so-called loaf-fraction retarding wing or door 39 preferably, for reducing the weight thereof, of a generally comb-like construction, as shown in Figure 9.

The respective retarder-doors 39 are adjustably supported from the brackets 38 for swingable movement in the respective guide-channels or ways provided by and between the respective pairs of guide-members 25—30, 30—31, 31—32, and 32—25, each respective door 39 gravitationally depending from its supporting bracket 38 for yieldingly engaging the particular loaf-fractions for halting the same temporarily in their movement after discharge thereof from the frames 1, 2, 3, 4, as the case may be, and as clearly seen in Figure 8.

At its rear end, the table 5 is spaced from and disposed in a plane below that of the grid-plate 20, and carries a sprocket-shaft 40 journaled suitably in and through the frame members 23. Mounted on the shaft 40, is a pair of spaced sprockets 41 having suitable co-operation with a pair of endless chains 42, which, rising over the sprockets 40, tangentially depart therefrom flush with the top of the table 5 for sliding support movably thereon and thereover in the direction of movement of the sliced loaves emerging from the series of knives 19, that is to say, away from the slicing machine J, the conveyer chains 42 at the opposite or forward end of the table 5 being trained over sprockets 43 mounted on a shaft 44 likewise suitably journaled in and between the frame-members 23, as best seen in Figure 10.

Suitably supported by, and spaced longitudinally on, the respective strands of the pair of chains 42, is a series of transverse rod-like conveyer flight-members or fraction-gathering bars 6, which, during their recurrent movement by and with the endless chains 42, successively rise upwardly over the end of the table 5 adjacent the grid-plate 20 for movement between the table 5 and the series of frames 1, 2, 3, 4, successive portions of the length of each particular bar 6 thereafter, at orderly intervals of bar-movement or travel, emerging progressively from under the respective frames 4, 3, 2, 1, in the order named and each frame, in turn, being at its free end liftingly engaged by the bar 6 for emergence of the bar thereunder, as best seen in Figure 8.

In use and operation, the series of bread-loaves to be sliced and composited are deposited on the feed plate 10 in groups, each group comprising in sequence preferably one loaf each of the different kinds of breads, as A, B, C, D, Figure 10, to be made up or rearranged into the corresponding group of composite loaves E, F, G, H, Figure 6. For example, each group of bread-loaves may comprise successively a loaf of white-bread A, a loaf of whole-wheat bread B, a loaf of rye-bread C, and a loaf of raisin-bread D.

Care is taken that the groups as deposited on the feed-plate 10 recur in orderly progression, as A, B, C, D; A, B, C, D; etc., each successive loaf being propelled initially by a particular flight 12 of the conveyer 11, and then delivered, in turn, to a particular feeder 14 for movement thereby to and through the series of slicing knives 19, as best seen in Figure 10.

While the series of loaves A, B, C, D, have a continuous progression to and through the series of slicing knives 19, the operation of the feeding mechanism of the slicing machine J is such that, as fully described in my said co-pending application, Serial No. 584,656, the successive loaves to be sliced, as C, D, A, B, in Figures 8 and 10, are fed by the feeders 14 at successive intervals through the series of slicing knives 19 for residing, as at A', B', etc., on the grid-plate 20 and frames 1, 2, 3, 4, in a side-by-side abutting series motivated in step-by-step manner by the succeeding feeder-propelled loaves emerging from the series of slicing knives 19, whereby the series of sliced loaves A', B', etc., are, in turn, sidewise propelled in a correspondingly intermittent progression to and over the frames 1, 2, 3, 4, in substantially the manner diagrammatically illustrated in Figures 1 to 6, inclusive, to which detail reference will presently be made.

Now in Figure 8 and likewise also in Figure 10, is illustrated by dot-dash lines the successive positions of a series of loaves in passage through the mechanism K, Figures 8 and 10, as far as may be applicable, being based on the diagrammatic representation of Figure 6. Thus, C represents an unsliced or whole loaf sidewise advancing toward the slicing knives 19, and B' a sliced loaf sidewise emerging from the series of knives 19, the acuminate edges 34 of the respective walls 30, 31, 32, having entered opposing kerfs in the sliced loaf B' for segregating or dividing the slices of the loaf into loaf-parts or fractions, as at b in Figure 8, and it will be understood that the fractions of the successive loaves are in a similar manner segregated into longitudinally contiguous or adjoining series, the respective series of loaf-fractions advancing between the corresponding pairs of guides 25—30, 30—31, 31—32, and 32—25.

A' represents the position of a sliced loaf abuttingly advanced by the succeeding loaf B', the particular fraction a of the loaf A' split by the wall 32 from the loaf-body being shown in Figure 8 disposed on the frame 4 between guide 32 and guide 25, said particular fraction a having reached the forward end of the frame 4 and being partly canted thereover.

D1 represents the position of the loaf preceding the loaf A', the loaf D1 having likewise been abuttingly advanced by the loaf A', and the particular fraction d' of the loaf D1 having thereby been deposited from the end of the frame 4 onto the table 5, as seen in Figure 8.

In its movement from the end of the frame 4 onto the table 5, the fraction d' engages the particular door 39 depending between the guides 32 and 25, the door 39 yielding to the movement of the loaf-fraction d' for inclinedly residing more or less against the advancing face thereof, whereby, under the weight of the so disposed door 39, the fraction d' is temporarily halted or yieldingly retained in deposited position on the table 5 at the end of the frame 4, the door-restrained fraction d', in turn, abuttingly engaging the next-adjacent or succeeding loaf-fraction a for preventing dislodgement thereof from the inclined end of the frame 4, as clearly seen in Figure 8.

As has been said, the bar 6 emerges from under the frame 4 for engaging the loaf-fraction d', and it will be understood that, in the present instance, the end of the frame 4 will be lifted responsively to such bar-movement, whereby the fraction a residing on the frame 4 will be correspondingly lifted by and with the frame 4 and the deposited fraction d' thereby freely exposed for engagement by the oncoming bar 6.

Now reverting particularly to Figures 1 to 6, both inclusive, each sliced loaf, as it leaves the slicing knives 19, has its slices disposed in a transverse row relatively to the grid-plate 20, and as the sliced loaf is engaged by the spaced guides 30, 31, and 32, it will be divided or segregated into approximately similar fractions, in number at least equal to the number of loaves in the group. Thus, in the present instance, each particular loaf A', B', C', D', is divided into four equal parts or fractions, designated as at a for the loaf A', as at b for the loaf B', as at c for the loaf C', and as at d for the loaf D', the fractions of the respective successive loaves being segregated as they leave the grid-plate 20 and move onto the respective frames or plates 1, 2, 3, and 4 into longitudinally contiguous series as described. The individual fractions of a particular loaf retain, however, their row-relation transversely of or across the series of frames 1, 2, 3, 4, the fractions of a loaf-row being substantially in the path of movement of the corresponding fractions of the other loaves in the progression.

The respective fractionally divided loaves A', B', C', D', are caused as described to intermittently progress a loaf-width at a time upon the series of laterally adjacent fraction-supporting plates 1, 2, 3, and 4, from which, following their stepped or staggered lengths, the several loaf-fractions will be discharged or deposited upon the table 5 in orderly sequence, each from its particular frame 4, 3, 2, 1, as the case may be, the so deposited loaf-fractions being then disposed in a staggered row upon the table 5. For purposes of description, the loaf-fractions so discharged from the respective frames 1, 2, 3, 4, will be referred to as deposited in the correspondingly respective loaf-lengthwise related positions (I), (II), (III), (IV).

Thus, assuming that such group of loaves A', B', C', D', has by four progressions been advanced suitably on and over the respective fraction-frames 1, 2, 3, 4, the loaf A' is represented by a fragmentary loaf A1 comprising merely a single fraction a' residing on the table 5 in position (I) opposite the end of the frame 1; likewise, the loaf B' is represented by a fragmentary loaf B1 comprising one fraction b residing on the frame 1 to the rear of the loaf fragment a' and a second fraction b' deposited on the table 5 opposite the frame 2 in position (II) to one side of and rearwardly a loaf-width from the fraction a'; the loaf C' is represented by a fragmentary loaf C1 having two fractions c remaining on the frames 1 and 2 and a fraction c' deposited on the table 5 in position (III) opposite the end of the frame 3 to one side of and rearwardly of the fraction $b'$; and the loaf D' is represented by a fragmentary loaf D1 having three fractions $d$ remaining on the frames 1, 2, 3, and a fraction $d'$ deposited on the table 5 in position (IV) opposite the end of the frame 4 to one side of and rearwardly of the fraction $c'$, all as best seen in Figure 1.

During each respective time period intervening between the intermittent progressions of the loaf-series, a bar-flight 6 passes or travels under the fraction-supporting frames 1, 2, 3, 4, for movement over the sorting-table 5 in the direction of travel of the series of loaves A', B', C', D', whereby, at orderly intervals of its movement, successive portions of the length of the bar 6 will progressively emerge, as I have described, from under the particular frames 4, 3, 2, 1, in the order named, for engaging the loaf-fractions $d'$, $c'$, $b'$, $a'$, successively in the order named, for gathering the same into a bar-propelled composite loaf E, the several fractions being aligned lengthwise along and by the bar as the latter moves over the table 5, and such fraction-gathering movement of the bar 6 thereby completing one sorting and gathering operation of the machine, as best seen in Figure 2.

It will be observed that the composite loaf E comprises an aggregation of respective fractions $a'$, $b'$, $c'$, $d'$, one fraction from each of the also respective loaves A', B', C', D', the respective fractions $a'$, $b'$, $c'$, $d'$, being arranged in the loaf E in loaf-positions (I), (II), (III), (IV), respectively.

With its one fraction $a'$ thus removed, the identity of the fragmentary loaf A1 disappears, and, the other fragmentary loaves B1, C1, D1, having been deprived of their respective table-deposited fractions $b'$, $c'$, $d'$, respectively, it will be further observed that the sorting table 5 is now cleared or prepared for deposit of the next successive series of loaf-fractions from the sorting frames 1, 2, 3, 4, on the ensuing or succeeding step or intermittent progression of the loaf-series for initiating the next loaf-sorting and gathering operation.

On such step-movement of the loaf-series, the fragmentary loaf B1 is moved forwardly over the frame 1 to the position B2 formerly occupied by the loaf A1 for deposit of a loaf-fraction $b'$ in position (I) on the table 5; the loaf C1 is moved forwardly to the position C2 vacated by the loaf B1, whereby one loaf-fraction $c'$ is deposited in position (II) on the table 5 while the other loaf-fraction $c$ remains on the frame 1. Similarly, the loaf D1 moves one step to position D2 with one fraction $d'$ deposited in position (III) on the table 5, the other fractions $d$ of the loaf remaining on the frames 1, 2, respectively. As the loaf-groups are recurrent, the next loaf A' in the succeeding series will be moved one step forwardly to the position A2 previously occupied by the loaf D1, the loaf A2 then having one fraction $a'$ deposited in position (IV) on the table 5 and the other fractions $a$ of the loaf A2 residing on the frames 1, 2, 3, respectively, all as best seen in Figure 3.

The operation is completed as another or succeeding bar 6 advances over the table 5, whereby the respective fractions $a'$, $d'$, $c'$, $b'$, are successively gathered into a second composite loaf F, which loaf F differs, however, from the former loaf E in the respective loaf-positions of its several aggregated fractions, the respective fraction-positions (I), (II), (III), (IV), being now occupied by the loaf-fractions $b'$, $c'$, $d'$, $a'$, in the order named and as best seen in Figure 4.

In like manner, the next progression of the loaf-series over the frames 1, 2, 3, 4, will move the loaf C2 to position C3, the loaf D2 to position D3, the loaf A2 to position A3, and bring a new loaf B' to position B3, for depositing on the table 5 a loaf-fraction $c'$ in position (I), a loaf-fraction $d'$ in position (II), a loaf fraction $a'$ in position (III), and a loaf-fraction $b'$ in position (IV), also as best seen in Figure 4, and, when still another bar 6 has been advanced over the table 5, a third composite loaf G will be gathered or aggregated by the bar 6, the respective positions (I), (II), (III), (IV) of the loaf G being occupied by loaf-fractions $c'$, $d'$, $a'$, $b'$, also respectively, and as best seen in Figure 5.

During the next loaf-fraction sorting and gathering operation, the loaf D3 is moved to D4, the loaf A3 to A4, the loaf B3 to B4, and a new loaf C' is moved to position C4, whereby respective loaf-fractions $d'$, $a'$, $b'$, and $c'$, are deposited at the ends of the frames 1, 2, 3, 4, in positions (I), (II), (III), (IV), also respectively, as shown in Figure 5, and such fractions are gathered by a bar 6 to form the composite loaf H having its respective positions (I), (II), (III), (IV), occupied by loaf-fractions $d'$, $a'$, $b'$, $c'$, also respectively, as seen in Figure 6, which completes the cycle of transformation of the homogeneous series of loaves A', B', C', D', into the series of composite loaves E, F, G, H.

It will be readily observed, reference being made to Figure 6, that the fractions of a particular kind of bread-loaf A', for example, are respectively rotated in positions (I), (II), (III), (IV), as may be said, in the group of the respective composite loaves E, F, G, and H, formed from a particular group of homogeneous loaves A', B', C', D'. Thus, in the loaf E the particular fraction of bread $a'$ will be located in position (I), in loaf F the fraction $a'$ will be in position (II), in loaf G, the fraction $a'$ will be in position (III), and in loaf H the bread fraction $a'$ will be found in position (IV), and in like manner for all the other loaves in the series of composite loaves E, F, G, H.

On next ensuing progression of the loaf-series, the loaf A4 is moved to A1, the loaf B4 to B1, the loaf C4 to C1, and a new loaf D' is moved to position D1, as shown in Figure 6, which in such respect is a repetition of Figure 1, and thus the foregoing successive fraction-sorting and gathering operations are repetitive in a continuous or cyclic-series during operation of the machine.

As indicated in Figure 6, the composite loaves E, F, G, H, may be removed after their formation by and with the flight-bars 6 to a suitable locality, or other means may be employed for removing the gathered composite loaves as may best serve the purpose. In the present apparatus, the composite loaves are successively shifted by the bars 6 along and to the discharge end of the table 5, from which they may be manually or mechanically removed, trayed, and packaged as is now generally practiced in connection with sliced baked loaf-bread, and in such regard it may be said that my said application Serial No. 584,656, describes a mechanism suitable for receiving such composite loaf, as H, in Figure 10, from the apparatus K for traying said loaf and delivering the trayed loaf to a wrapping machine.

It will be understood, of course, that the composite loaf may contain more than one fraction of a particular kind of bread; for example, the loaves A' and C' may be of white bread, and the intervening loaves B' and D' may be other varieties of bread, as whole-wheat and rye-bread, respectively. Further, there may be more or less than four fractions in the aggregated composite-loaf, and the loaf-fractions may vary in size or in number of slices to meet particular requirements.

Thus, mechanically formed, a finished composite-loaf package may contain parts or fractions of different kinds or types of baked bread to satisfy the taste of different members of the same family, obviating in such regard the necessity on the part of the house-wife of purchasing and furnishing an equal number of whole loaves of the different kinds of bread, and economically eliminating the risk of waste and loss from staling of unconsumed loaf-portions left over from day to day.

It will be understood that changes and modifications in the form, construction, arrangement, and combination of the several parts of the apparatus may be made and substituted for those herein shown and described without departing from the nature and principles of my invention.

Having thus described my invention, what I claim and desire to secure by Letters Patent is,—

1. Composite-loaf forming apparatus including, in combination, means for dividing several loaves into sidewise adjacent fractions, means for progressively advancing in successive rows the fractions of the respective loaves, means for separating a fraction from each of said several rows, and means for gathering the separated fractions into composite loaf formation.

2. Composite-loaf forming apparatus including, in combination, means for dividing several loaves into fractions, means for progressively advancing in successive transverse rows the fractions of the respective loaves, means for segregating the loaf-fractions of the several rows into contiguous longitudinal series, and means for automatically selectively aggregating a fraction from each of said series into composite loaf formation.

3. Composite-loaf forming apparatus including, in combination, means for dividing several loaves into fractions, means for progressively advancing in successive transverse rows the fractions of the respective loaves, means for segregating the loaf-fractions of the several rows into contiguous longitudinal series, and means for automatically aggregating the respective foremost fractions of the several series into composite loaf formation.

4. Composite-loaf forming apparatus including, in combination, means for dividing several loaves into fractions, means for progressively advancing in successive transverse rows the fractions of the respective loaves, means for segregating the loaf-fractions of the several rows into contiguous longitudinal series, means for separating a fraction from each of said series, and means for gathering the separated fractions into composite loaf formation.

5. Composite-loaf forming apparatus including, in combination, means for dividing several loaves into fractions, means for progressively advancing in successive transverse rows the fractions of the respective loaves, means for segregating the loaf-fractions of the several rows into contiguous longitudinal series, means for disposing the respective foremost fraction of each of said series into a staggered row, and means for gathering the so disposed row into composite loaf formation.

6. Composite-loaf forming apparatus including, in combination, means for dividing several loaves into fractions, a table, means for progressively advancing in successive transverse rows the fractions of the respective loaves, means for segregating the advancing loaf-fractions into contiguous longitudinal series, means for depositing in a staggered row on the table the foremost fractions of the respective series, and means comprising a gathering-bar movable over the table for aggregating said deposited row into composite loaf formation.

7. Composite-loaf forming apparatus including, in combination, means for dividing several loaves into fractions, a table, means for progressively advancing in successive transverse rows the fractions of the respective loaves, means for segregating the advancing loaf-fractions into contiguous longitudinal series, means comprising a series of frames for receiving the respective advancing series of loaf-fractions, said frames being of different lengths for depositing in a staggered row on the table the advanced foremost fractions of the several respective series, and means comprising a gathering-bar movable over the table for aggregating said deposited row into composite loaf formation.

8. Composite loaf forming apparatus including, in combination, means for dividing several loaves into fractions, a table, means for progressively advancing in successive transverse rows the fractions of the respective loaves, means for segregating the advancing loaf-fractions into contiguous longitudinal series, means comprising a series of pivotally swingable frames for receiving the respective advancing series of loaf-fractions, said frames being of different lengths and disposed lengthwise over the table for disposing in a staggered row on the table the foremost advanced fractions of the several respective series, and means comprising a gathering-bar movable over the table and from under the respective frames for aggregating said deposited row into composite loaf-formation.

9. Composite-loaf forming apparatus including, in combination, means for dividing several loaves into fractions, a table, means for progressively advancing in successive transverse rows the fractions of the respective loaves, means comprising a series of spaced partitions for segregating the advancing loaf-fractions into contiguous longitudinal series, means comprising a series of pivotally swingable frames for receiving the respective advancing series of loaf-fractions, said frames being of different lengths and disposed lengthwise over the table for disposing in a staggered row on the table the advanced foremost fractions of the several respective series, and means comprising a gathering-bar movable over the table and from under the respective frames for aggregating said deposited row into composite loaf-formation.

10. Composite-loaf forming apparatus including, in combination, means for dividing several loaves into fractions, a table, means for progressively advancing in successive transverse rows the fractions of the respective loaves, means comprising a series of spaced partitions for segregating the advancing loaf fractions into contiguous longitudinal series, means comprising a series of pivotally swingable frames for receiving the respective advancing series of loaf-fractions, said frames being of different lengths and disposed lengthwise over the table for disposing in a staggered row on the table the advanced foremost fractions of the several respective series, means for yieldingly retarding movement of the loaf-fractions advancing on said frames, and means comprising a gathering-bar movable over the table and from under the respective frames for aggregating said deposited row into composite loaf formation.

11. Composite loaf forming apparatus including, in combination, means for dividing several loaves into fractions, a table, means for progressively advancing in successive transverse rows the fractions of the respective loaves, means comprising a series of spaced partitions for segregating the advancing loaf fractions into contiguous longitudinal series, means comprising a series of pivotally swingable frames for receiving the respective advancing series of loaf-fractions, said frames being of different lengths and disposed lengthwise over the table for disposing in a staggered row on the table the advanced foremost fractions of the several respective series, wings supported for swingable movement intermediate the respective partitions for yieldingly retarding movement of the loaf fractions advancing on said frames, and means comprising a gathering-bar movable over the table and from under the respective frames for aggregating the said deposited row into composite loaf formation.

12. Apparatus for forming composite loaves from a progression of loaf-fractions moving in adjacent series including a sorting table, conveyer-means comprising a recurrent progression of bar-flight carriers movable over said table, a plurality of adjacent sorting frames extending over the table and having their discharge ends respectively disposed at different points along the path of travel of the carriers, and means for progressively feeding the loaf-fractions to and over the respective frames for repetitively depositing respective fractions therefrom in a staggered series on the table for engagement by the successive carriers for aligning the deposited fractions into composite loaf formation.

13. Apparatus for forming composite loaves from a progression of loaf-fractions including a delivery plate for receiving the loaf-fractions in successive rows thereof, a fraction-sorting table, a plurality of swingable sorting frames extending over the table for endwise engaging the same at different distances therealong from the delivery plate, and a recurrent progression of bar-flight carriers movable over said table for progressively emerging from under the respective sorting frames for successively engaging respective loaf-fractions deposited from the sorting frames onto the sorting table.

14. Apparatus for forming a composite loaf from a progression of loaf-fractions moving in adjacent series comprising a movable carrier, a plurality of adjacent sorting frames lengthwise extending different distances over the path of travel of the carrier, and means for feeding the loaf-fractions to and over said sorting-frames for depositing successive fractions therefrom into the path of the carrier.

15. Apparatus for forming a composite loaf from a progression of loaf-fractions moving in adjacent series comprising a movable carrier, a plurality of adjacent sorting frames extending different distances over the path of travel of the carrier, and means for feeding the loaf-fractions to and over said sorting-frames for depositing successive fractions therefrom into the path of the carrier, said means including spaced guide-walls for segregating the loaf-fractions into adjacent series each for movement over a respective sorting frame.

16. Apparatus for the production of a composite loaf from a group of loaves comprising, in combination, means for progressively moving the several loaves, means comprising spaced walls for dividing the successive loaves into fractional parts, and means for separating a fraction from each of said loaves for sidewise aggregation into composite loaf formation.

17. Apparatus for the production of a composite loaf from a group of loaves comprising in combination, means for progressively moving the several loaves, means comprising spaced walls for dividing the successive loaves into fractional parts, means for segregating the loaf-fractions into contiguous longitudinal series, a table, and means for disposing on the table a fraction from each of said series for sidewise aggregation into composite loaf formation.

18. Apparatus for the production of a composite loaf from a group of loaves comprising, in combination, means for progressively moving the several loaves, means for dividing the successive loaves into transverse rows of fractional parts, means for segregating the advancing fraction-rows into contiguous longitudinal series, a table, means for repetitively depositing in a staggered row on the table a fraction from each of said advancing series, the deposited fractions from a particular original loaf varying in their relative positions in the successively deposited staggered rows, and means for aggregating said deposited fractions into composite loaf-formation.

19. Apparatus for the production of a composite loaf from a group of loaves including, in combination, means for progressively moving the several loaves, means for dividing the successive loaves into transverse rows of fractional parts, means for segregating the advancing fraction-rows into contiguous longitudinal series, a table, means for receiving the respective advancing series of loaf-fractions for depositing on the table a fraction from each of said series, and means comprising a gathering-bar for aggregating said deposited fractions into composite loaf-formation.

20. Apparatus for the production of a composite loaf from a progression of homogeneous loaves of different varieties including, in combination, a conveyer for feeding the several loaves in a predetermined orderly succession, means for dividing the successive loaves into fractional parts, a table, means for repetitively sorting and depositing on the table a fraction from each of said series, and means for aggregating said deposited fractions into composite loaf-formation, the deposited fractions from a particular original loaf varying in their relative positions in the successively formed composite loaves.

21. Apparatus for the production of a composite loaf from a group of loaves comprising, in combination, means for progressively moving the several loaves, means comprising spaced partitions for dividing the successive loaves into fractional parts, a table, and means including a series of different length frames for automatically sorting a fraction from each of said loaves for selective removal from the table.

22. In combination, a table, means for progressively advancing on the table in successive rows the fractions of several respective loaves, and means including a series of different length frames upstanding from the table for sorting a fraction from each of the advancing rows.

23. In combination, means for progressively advancing in successive transverse rows the fractions of several respective loaves, a table, means for segregating the loaf-fractions of the several rows into contiguous longitudinal series, and conveyer means movable over the table for shifting the respective series along the table for removal.

24. In combination, a table, means for progressively advancing in successive transverse rows the fractions of several respective loaves, means comprising a series of spaced partitions for segregating the advancing loaf-fractions into contiguous longitudinal series, and conveyer-means movable over the table for shifting the respective segregated series along the table for selective removal.

25. In combination, means for dividing successive loaves into fractions, a table, means for segregating the loaf-fractions of the several loaves into series, and conveyer means movable over the tables for shifting the respective series along the table for removal.

26. In combination, means for dividing successive loaves into fractions, a table, spaced partitions disposed with relation to the table for segregating the loaf-fractions into series, and conveyer means movable over the table for shifting the respective series along the table.

ANTHONY B. TEWES.